2,703,516

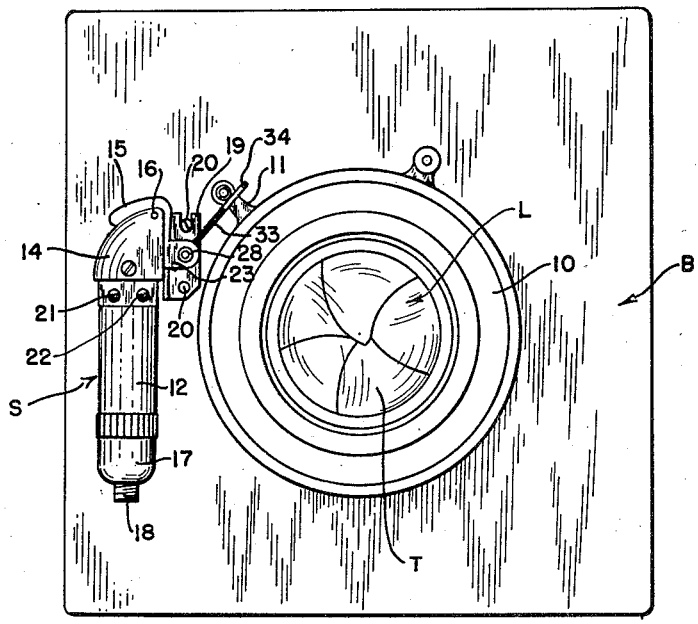
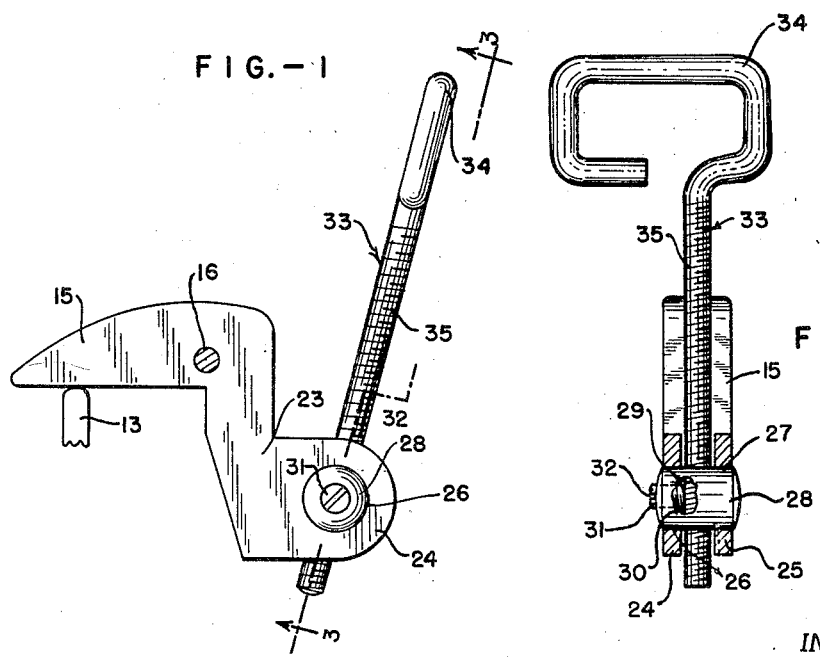
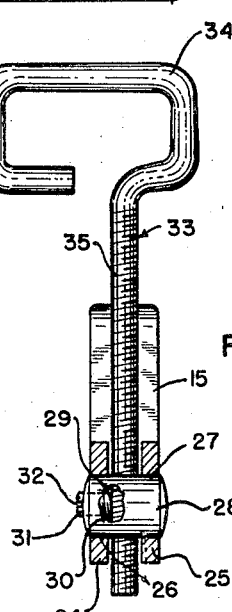
FIG.—1
FIG.—2
FIG.—3
INVENTORS
Robert D. Kluge &
Raymond J. Breer
BY
ATTORNEYS

United States Patent Office 2,703,516
Patented Mar. 8, 1955

SYNCHRONIZER FOR CAMERA SHUTTERS, INCLUDING ADJUSTABLE SOLENOID LINKAGE

Robert D. Kluge, Denver, and Raymond J. Breer, Boulder, Colo., assignors, by mesne assignments, to Minneapolis-Honeywell Regulator Company, Minneapolis, Minn., a corporation of Delaware Application June 4, 1951, Serial No. 229,702

1 Claim. (Cl. 95—11.5)

This invention relates to synchronizers for operating camera shutters in timed relation to the firing of a photo flash bulb or other source of light, and more particularly to the connecting of the solenoid of the synchronizer to the shutter operating lever.

One of the objects of this invention is to produce an improved connecting structure between a pivoted member operable in response to the energization of a synchronizer magnet coil and the operating lever of a camera shutter, which connecting structure will be simple in construction, adaptable to various types and kinds of cameras, economical to manufacture and also one which will permit easy and efficient installation of the synchronizer on various makes of cameras.

Another object of this invention is to produce an improved connection for permitting a synchronizer to be efficiently connected to operate a camera shutter lever when the synchronizer is mounted on the camera lens board, said adjustable connection including the embodiment between two members of a combined pivotal joint and an adjustment for varying the connected length of one of the members.

A further object is to produce an improved adjustable pivot joint between two members which will permit free swinging movement between the members and also allow for one of the members to have its effective length changed as desired.

Still a further object is to produce an improved adjustable joint between two members which will be easy to assemble, readily adjustable and also embody structure for locking the adjustment.

Other objects of the invention will become apparent from the following description taken in connection with the accompanying drawing showing a preferred embodiment, and in which:

Figure 1 is a front view of a camera lens board provided with a shutter and showing mounted on the board a synchronizer connected to the shutter operating lever by structure embodying the invention;

Figure 2 is an enlarged side view of the synchronizer actuated lever and the rod by which it is connected to the lever, said lever and rod being connected together by the improved adjustable pivot joint; and Figure 3 is another enlarged view, partly in section, showing additional details, said view being taken approximately on the line 3—3 of Figure 2.

Referring to the drawings in detail and first to Figure 1 thereof, B is a usual camera lens board, to the back of which is attached the camera bellows. This lens board has a frame structure 10 mounted thereon in which is carried the shutter T and the lens L, all well known structure. The shutter T is adapted to be operated by a lever 11 extending from the side of the frame.

When photo flash equipment is to be used with a camera, it is necessary to the taking of good pictures to have the shutter operated in timed relation with the firing of the flash bulb. This is accomplished by the use of a so-called synchronizer. Such a synchronizer is shown at S in Figure 1. It is an eletctromagnet and is so constructed and connected to the shutter lever that upon energization thereof it will operate or "trip" the shutter. Associated with the synchronizer, but not shown, will be a battery, a switch and the flash bulb with reflector. The bulb, battery, switch and synchronizer are all connected in circuit so that closing thereof by operation of the switch will result in energizing the synchronizer and firing of the bulb. By proper adjustment the desired timed relation of the flash and shutter operation will be accomplished so that a good picture will result.

The synchronizer S, shown in Figure 1, is of known construction having a body 12 containing the coil and movable plunger. The upper end of this plunger, shown at 13 in Figure 2, extends into a head 14 carried by the top of the body and is arranged to operate a lever 15 pivoted in a slot thereof by a pivot pin 16. The bottom of the body 12 carries a cap 17 and mounted therein is an adjustable stop screw 18 for the plunger, whereby the "throw" of the plunger can be adjusted. The synchronizer S is mounted on the lens board by a bracket 19 secured to the head 14 and attachable to the board by screws 20. The synchronizer carries plug terminals 21 and 22 whereby an electrical cord can be attached thereto to place the synchronizer coil in circuit.

In accordance with our invention there is provided on the lever 15 an extending portion or arm 23 which has a bifurcated end formed by parallel projections 24 and 25. Each of these projections has a bearing hole, shown at 26 and 27, the axes of which are aligned. Rotatably mounted in these bearing holes is a short shaft 28 of uniform diameter. This shaft has a threaded bore 29 extending transversely therethrough at the center of its length and also a second threaded bore 30 extending from one end of the shaft axially inwardly to a junction with the transverse threaded bore. Threaded into this latter bore 30 is a locking screw 31 of a length slightly greater than the bore and having at its outer end a screw driver slot 32 whereby it may be screwed in and out.

Screwed into the transverse threaded bore 29 is a rod 33 of a suitable length provided at one end with a hook 34 to hook over the end of the shutter lever 11. The threads 35 on the shank of the rod are fine, as are the threads in the transverse bore. With this arrangement the distance the hooked end from the shaft 28 and the end of lever 15 can be varied as desired. Very small adjustments will be permitted. The rod will be locked in any adjusted position by the locking screw 31. The hook 33 is so constructed that a major part of it is off center with the axis of the rod. Thus, by turning the rod one way or the other through 180 degrees, the hook can be so shifted as to be easily placed over the shutter operating lever, regardless of different distances it might be from the lens board when the synchronizer is mounted thereon.

From the foregoing detailed description, it is believed to be apparent as to the manner of operation of our improved connection between the synchronizer and the shutter. In assembling the adjustable pivot joint, the shaft 28 is slid lengthwise into the aligned openings 26 and 27 in the projections on the arm 23. The rod 33 is then screwed into the transverse threaded bore 29.

In mounting and connecting the synchronizer, it is first attached to the lens board at a proper place by the bracket 19 and screws 20. The proper place need not be exact, only within range to place the hooked end of the rod over the shutter operating lever.

After mounting the synchronizer, the rod can be adjusted in the shaft 28, as required to bring about the proper tripping of the shutter with the firing of the flash bulb. This adjustment is done by turning the rod to shorten or lengthen the distance of the hook from the arm 23 of solenoid operated lever 15. Adjustment is made with the hook 34 off the shutter operating lever 11. After adjustment is proper and the position of the hook is right to easily slip onto the shutter lever (by pressing it down), the adjustment will be locked by the screwing up of the lock screw 31.

It will be noted that with the rod 33 extending through the transverse bore of the pivot shaft 28, this shaft will be held in the bearing holes 26 and 27 in the projections and cannot slip out, yet there will always be free swinging movement of the rod and shaft. Also, if the rod has to be so shortened to make a connection that its lower extending end may engage arm 23 during swinging and thus interfere with proper free pivoting of the shaft, this lower extending end can be cut off by a suitable tool.

It will be further noted that there is only one connection between the synchronizer operated lever 15 and the rod which connects with the shutter lever. In this connection there is embodied a pivotal connection and an adjustment to vary the length of the rod. Once an adjustment is made and locked, it will remain set. A further feature of the invention is that the improved connection permits the synchronizer to be more easily mounted on a larger number of different kinds of cameras. In prior connections the lever arm 23 had an outwardly extending sliding member carried thereby in a suitable socket to make the adjustment. Thus, the synchronizer could not be set as close to the lens frame as desirable in some instances because room had to be left to permit sliding outward of the member to make the adjustment. In the present improvement the synchronizer can be mounted up as closely to the lens frame as will permit swinging of arm 23. No space need be left for permitting adjustment, as this is done merely by screwing a rod in a bore of a shaft in the arm. Another feature of the improved connection embodying the invention is that the length of arm 23 never changes, regardless of adjustment. The pull on rod 33 is always at a fixed leverage as the point of connection of the rod 33 with the arm never changes. This makes for more efficient design and operation.

Being aware of the possibility of modifications in the particular structure shown as embodying the invention, all without departing from the fundamental principles thereof, it is desired that it be understood the invention is not to be limited in its scope except in accordance with the appended claim.

What is claimed is:

In a synchronizer for timed firing of a flash lamp and operation of a camera shutter, in combination, a solenoid, a shutter operating lever, a lever pivotally mounted on the solenoid and having an arm provided with a bifurcated end formed by spaced parallel projections, said projections being provided with axially aligned bearing openings, a shaft capable of being slid into the openings from one side of the arm and being provided with a transverse threaded bore which will be positioned between the projections when the shaft is mounted in the bearing openings, a threaded rod having at one end an integral hook for cooperation with the shutter operating lever, said rod being screwed into the bore for permitting adjustment of the length of that part of the rod between the shaft and hook, a second axially threaded bore in the shaft extending axially inwardly from one end of the shaft to the transverse bore, and a locking screw in the said second bore for engaging and locking the threaded rod in any adjusted position, said combination providing a structure for unitary mounting on a camera.

References Cited in the file of this patent

UNITED STATES PATENTS

| | | |
|---|---|---|
| 1,329,008 | Peycke | Jan. 27, 1920 |
| 1,999,278 | Britten | Apr. 30, 1935 |
| 2,464,671 | Castedello | Mar. 15, 1949 |
| 2,480,122 | Daniels | Aug. 30, 1949 |
| 2,523,660 | Hulstein | Sept. 26, 1950 |
| 2,614,467 | Johnson et al. | Oct. 21, 1952 |